UNITED STATES PATENT OFFICE.

WILLIAM LAUBHEIMER AND HENRY SALZER, OF BALTIMORE, MARYLAND; SAID LAUBHEIMER ASSIGNOR TO SAID SALZER.

PRESERVATION OF MEAT.

SPECIFICATION forming part of Letters Patent No. 477,844, dated June 28, 1892.

Application filed August 8, 1891. Serial No. 402,081. (No specimens.)

*To all whom it may concern:*

Be it known that we, WILLIAM LAUBHEIMER and HENRY SALZER, residents of Baltimore, in the State of Maryland, have invented a new and useful Improvement in the Preservation of Meat, which improvement is fully set forth in the following specification.

This invention has reference more particularly to the preservation of meat for long periods of time in a perfectly wholesome and natural state.

In Letters Patent Nos. 384,720 and 384,721, granted June 19, 1888, to Henry Salzer, a process of packing and preserving food articles is described, upon which process the present invention is an improvement. Such process consists, essentially, in inclosing the meat in a shell composed of plaster-of-paris or similar material, sterilizing it, and closing the pores of the shell in such manner as to exclude all germs of bacilli, as well as all atmospheric influences. The object sought was to supply consumers with meat in a sterilized condition (and therefore more wholesome than even fresh meat) and which has no foreign flavor of any sort (such as is acquired by canned goods) to distinguish it from freshly-cooked meat.

In practically carrying out this process difficulty has been experienced in producing packages of uniform size and saleable appearance, and in manipulating the meat in the successive steps of the process following the first steaming operation, and in the production of a package from which the meat could be obtained free from all foreign substances and from all acquired flavor. These difficulties are now overcome by the following procedure:

The meat is first steamed for a sufficient time to reduce the bulk of the meat. In this step instead of steaming in an open vessel with low-temperature steam, I use dry steam in a close vessel, the effect of which is to form a film of coagulated albumen, preventing the escape of juices. The meat is then allowed to stand until perfectly cold. It is next subjected to strong compression in molds for a period of about six hours. It has been shown by past experience of meat-packers that meat compressed after cooking will not retain its shape or hold together. It is the practice, therefore, to force the meat into cans or other receptacles under pressure. In carrying out my process it is essential, first, that the meat should be pressed cold, and, second, that it should remain in the mold for a long period of time. When this is done, I obtain a solid and coherent piece of the desired shape, which does not disintegrate, swell, or change its form while the plaster shell is drying and hardening around it. The meat thus treated is next wrapped in paper and inclosed in a tightly-fitting jacket of fabric impregnated and coated with plaster-of-paris. When this has dried and hardened, it is put into a can and the space between the package and can filled with the grease (suet, lard, or tallow) of the meat itself, which grease has been melted and strained, and in that state is thoroughly sterilized before the can is finally sealed. It is the common custom in packing meat to fill the vacant spaces of the can with the animal fat and heat before sealing; but on cooling there is a great contraction of the grease, so that about one-third of the piece of meat projects above the level to which the grease settles. By my process the plaster shell absorbs so much fat that the meat is wholly enveloped therein, and this continuous coating of fat has a remarkable effect in preserving the delicacy and flavor of the meat.

By this improvement the operation is much facilitated, the bulk of the article is reduced, cracks or breaks in the continuity of the plaster shell are avoided, material is saved, and the production of packages of uniform size and appearance inclosed in a tightly-fitting envelope is insured.

For the production of the best results as to preservation of the natural condition and flavor of the meat, the entire process as above pointed out should be followed; but where cheapness is important the package, instead of being placed in a can and treated as described, may after pressure and application of the plaster shell be sterilized in a bath of melted paraffine or equivalent substance, as described in the above-mentioned patents.

I claim as my invention—

1. The described process of preserving meat by steaming or partially cooking the same, cooling, compressing while cold for a sufficient space of time, as specified, to produce a coherent mass, and then applying a plastic envelope or shell, such as plaster-of-paris, allowing the same to harden around the mass, as set forth.

2. The described process of preserving meat by steaming in a close vessel with high-temperature steam, cooling, compressing while cold, applying an envelope of fabric impregnated with plaster-of-paris, and sterilizing in a bath of plastic substance, as set forth.

3. The described process of preserving meat by successive steps of steaming, cooling, compressing while cold, enveloping in a shell of fabric and plaster-of-paris, and when the latter has hardened placing in a can, with the natural fat of the meat surrounding the package, heating and sealing the can, as set forth.

In testimony whereof we have signed this specification in the presence of two subscribing witnesses.

WILLIAM LAUBHEIMER.
HENRY SALZER.

Witnesses:
WILLIAM H. BERRY,
THOS. M. DOBBIN.